United States Patent
Hench et al.

(10) Patent No.: US 10,677,586 B2
(45) Date of Patent: Jun. 9, 2020

(54) PHASE REVEALING OPTICAL AND X-RAY SEMICONDUCTOR METROLOGY

(71) Applicant: KLA-TENCOR CORPORATION, Milpitas, CA (US)

(72) Inventors: John Hench, Los Gatos, CA (US); Andrei Veldman, Sunnyvale, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 131 days.

(21) Appl. No.: 16/047,818

(22) Filed: Jul. 27, 2018

(65) Prior Publication Data

US 2020/0080836 A1 Mar. 12, 2020

(51) Int. Cl.
*G01N 21/94* (2006.01)
*G01B 11/06* (2006.01)
*G01N 23/083* (2018.01)
*G06T 9/20* (2006.01)
*G01N 21/95* (2006.01)

(52) U.S. Cl.
CPC ..... *G01B 11/0641* (2013.01); *G01N 21/9503* (2013.01); *G01N 23/083* (2013.01); *G06T 9/20* (2013.01)

(58) Field of Classification Search
CPC .. G01B 11/0641; G06T 9/20; G01N 21/9503; G01N 23/083; G01N 23/046; G01N 2223/419
See application file for complete search history.

(56) References Cited

U.S. PATENT DOCUMENTS

| | | |
|---|---|---|
| 5,608,526 A | 3/1997 | Piwonka-Corle et al. |
| 5,859,424 A | 1/1999 | Norton et al. |
| 6,429,943 B1 | 8/2002 | Opsal et al. |
| 7,478,019 B2 | 1/2009 | Zangooie et al. |
| 7,933,026 B2 | 4/2011 | Opsal et al. |
| 9,915,522 B1 | 3/2018 | Jiang et al. |
| 2013/0094716 A1 | 4/2013 | Carpio et al. |
| 2014/0111791 A1 | 4/2014 | Manassen et al. |
| 2014/0129203 A1 | 5/2014 | Kuboi et al. |
| 2014/0172394 A1 | 6/2014 | Kuznetsov et al. |
| 2014/0222380 A1 | 8/2014 | Kuznetsov et al. |
| 2014/0297211 A1 | 10/2014 | Pandev et al. |
| 2015/0204664 A1 | 7/2015 | Bringoltz et al. |
| 2015/0300965 A1 | 10/2015 | Sezginer et al. |
| 2016/0216197 A1 | 7/2016 | Bringoltz et al. |
| 2017/0276613 A1 | 9/2017 | Liu et al. |
| 2017/0309448 A1 | 10/2017 | Boughorbel et al. |

OTHER PUBLICATIONS

WIPO, ISR for PCT/US2019/043541, Nov. 15, 2019.

*Primary Examiner* — Peter B Kim
(74) *Attorney, Agent, or Firm* — Hodgson Russ LLP

(57) ABSTRACT

The embodiments disclosed herein can enable a target on a semiconductor wafer to be reconstructed and/or imaged. A surface of a target on a semiconductor wafer is measured using a wafer metrology tool. A voxel map of the surface is fixed to match geometry measurements and using scattering density of expected materials. Uniform scaling of the scattering density of all fixed surface voxels can occur.

20 Claims, 9 Drawing Sheets

PHASE REVEALING OPTICAL AND X-RAY SEMICONDUCTOR METROLOGY

FIELD OF THE DISCLOSURE

This disclosure relates to semiconductor metrology.

BACKGROUND OF THE DISCLOSURE

Evolution of the semiconductor manufacturing industry is placing ever greater demands on yield management and, in particular, on metrology and inspection systems. Critical dimensions continue to shrink. Economics is driving the industry to decrease the time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Metrology processes are used at various steps during semiconductor manufacturing to monitor and control the process. Metrology processes are different than inspection processes in that, unlike inspection processes in which defects are detected on wafers, metrology processes are used to measure one or more characteristics of the wafers that cannot be determined using existing inspection tools. Metrology processes can be used to measure one or more characteristics of wafers such that the performance of a process can be determined from the one or more characteristics. For example, metrology processes can measure a dimension (e.g., line width, thickness, etc.) of features formed on the wafers during the process. In addition, if the one or more characteristics of the wafers are unacceptable (e.g., out of a predetermined range for the characteristic(s)), the measurements of the one or more characteristics of the wafers may be used to alter one or more parameters of the process such that additional wafers manufactured by the process have acceptable characteristic(s).

In semiconductor metrological tomography, a free-form scattering density map (SDM) is determined from diffracted light from a periodic planar target. For hard x-rays, this scattering density is a complex number representing a real part that is the deviation from unity of the index of refraction and an imaginary part that is the index of extinction. Upon a constant inverse scaling involving the classical electron radius multiplied by the x-ray wavelength squared divided by $2\pi$, the real part of the SDM is equivalent to the electron density of the material. As such, the term electron density is often used as an ersatz definition for scattering density. Density determination is the result of an optimization process that matches simulated and measured diffraction patterns while regularizing the SDM. The SDM takes the form of a set scattering densities assigned to volume elements (voxels) that tile the scattering volume of the x-ray target, typically a periodic unit cell in the planar (x, y) directions and the typically non-periodic scattering region perpendicular to it (z). This scattering volume is denoted as the extended unit cell.

One of the disadvantages of techniques that attempt to infer the SDM from diffracted light intensities is that there is no absolute or relative phase information available in the measurement. As such, there is no mechanism to uniquely determine the SDM. Indeed, there are many instances of the SDM that can produce precisely the same diffracted light signal. Furthermore, the height dependency on the location of the scattering volume is weak in the hard x-ray spectra. Because of this, several ambiguities arise in the resolved SDM, including translational, space fraction, and vertical inversion ambiguities. With the translational ambiguity, the SDM may be shifted in any direction without a change in the simulated measurement, thus having no effect on the constraint. With the space fraction ambiguity, two separate geometries in simple structures can produce the same scattering profiles for all orders except for the zeroth order. With vertical inversion ambiguity, the single scattering model produces the same simulated spectra if the SDM is flipped with respect to a horizontal plane.

The previous techniques attempted to resolve the lack of phase by, in a sense, borrowing phase from the SDM initial condition and/or penalizing the difference in the optimization between the resolved SDM and the initial SDM. Inducing the phase from the initial condition, however, can skew the estimated SDM toward the initial SDM. This can produce features in the estimated SDM that would not otherwise be there or suppress geometric features which should be there.

Therefore, improvements in metrology are needed.

BRIEF SUMMARY OF THE DISCLOSURE

In a first embodiment, a method is provided. The method includes measuring a surface of a target on a semiconductor wafer using a wafer metrology tool. Using a processor, a voxel map of the surface is fixed to match geometry measurements and using scattering density of expected materials. Uniform scaling of the scattering density of all fixed surface voxels occurs.

In an example, the wafer metrology tool is a critical dimension scanning electron microscope.

In another example, the wafer metrology tool is a reflection small angle x-ray scatterometer. The method can include measuring the surface of the target with a measurement tool configured in reflection mode. The measurement tool may be a transmission small angle x-ray scatterometer.

In another example, the wafer metrology tool is an optical scatterometer. The method can include measuring the surface of the target with a measurement tool configured use a transmission technique. The measurement tool may be a transmission small angle x-ray scatterometer.

Measuring the surface of the target can include measuring a geometry of the target to provide the geometry measurements.

The voxels can take scattering values from a set of values associated with materials in the target. The scattering values can float continuously.

In a second embodiment, a system is provided. The system includes a wafer metrology tool configured to measure a surface of a target on a semiconductor wafer and a processor in electronic communication with the wafer metrology tool. The processor is configured to fix a voxel map of the surface to match geometry measurements and using scattering density of expected materials. Uniform scaling of the scattering density of all fixed surface voxels occurs.

In an example, the wafer metrology tool is a critical dimension scanning electron microscope.

In another example, the wafer metrology tool is a reflection small angle x-ray scatterometer. The system can include a measurement tool configured use a reflection mode in electronic communication with the processor. The measurement tool may be a transmission small angle x-ray scatterometer.

In another example, the wafer metrology tool is an optical scatterometer. The system can include a measurement tool configured use a transmission technique in electronic communication with the processor. The measurement tool may be a transmission small angle x-ray scatterometer.

The system can include a measurement tool configured use a transmission technique in electronic communication with the processor. The wafer metrology tool can be further configured to measure a geometry of the target. In an example, the wafer metrology tool is a reflection small angle x-ray scatterometer or an optical scatterometer, and the measurement tool is a transmission small angle x-ray scatterometer. The system can include an electronic data storage unit configured to store a plurality of scattering values associated with materials in the target. The electronic data storage unit may be in electronic communication with the processor. The processor can be configured to take scattering values from the set of values for the voxels. The scattering values can float continuously.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that only provide a subset of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein describe two types of phase retrieval or partial retrieval. The first type is from imaging methods wherein a portion of the object can be measured. This measurement can then be used to amend the initial condition or provide an additional penalty term to the optimization. The second type uses scatterometry methods whereby the additional measured spectra contains additional information that helps resolve at least the vertical ambiguity. These two types of phase retrieval or partial retrieval may be used in combination to provide improved results for certain structures. The embodiments disclosed herein can enable a target to be reconstructed and/or imaged more effectively than with transmission-small angle X-ray scattering (T-SAXS) scatterometry alone. Embodiments of the computational method described herein also can reduce the time to results for tomography.

Using phase retrieval as described herein, after part of the SDM is determined, a unique solution for the remaining unknown part of the SDM may be obtained from the measured signal. Methods are described wherein the top layer of the SDM map of the extended unit cell are elaborated. Other embodiments determine other sections of the SDM.

Fixing any part of the SDM does not necessarily guarantee a unique solution of the SDM from the measured diffraction signal alone. However, given a sufficient number of measurement configurations and a sufficient amount of scattering from the fixed portion of the SDM, a unique solution may be obtained.

Figure 1:
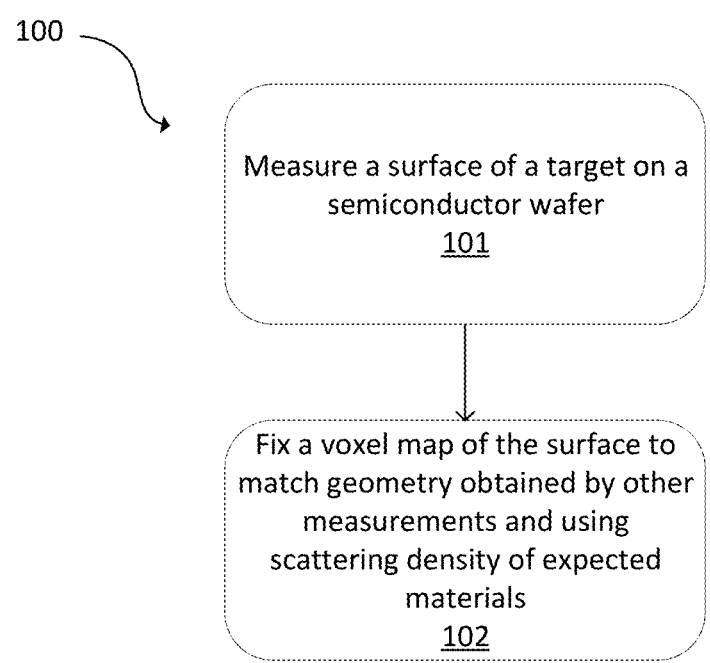
FIG. 1 is a flowchart of an embodiment of a method in accordance with the present disclosure.

FIG. 1 is a flowchart of a method 100. Using method 100, the SDM of a top layer of a target can be assigned and the SDM below the top layer can be determined. At 101, a surface of a target on a semiconductor wafer is measured using a wafer metrology tool. For example, the wafer metrology tool may be a critical dimension scanning electron microscope (CD-SEM), a reflection small angle x-ray scatterometer, or an optical scatterometer.

After the measurement determines the geometry of the top surface of the target, the SDM of the top layer of voxels is assigned based on the measured geometry using the scattering density of the materials expected to be present of the surface of the target. If the incident radiation flux is not independently accounted for in the scattering computation, a uniform scaling of the scattering density of all fixed surface voxels may be used to account for uncertainty in the radiation flux. For example, at 102 a voxel map of the surface is fixed to match geometry obtained by other measurements and using scattering density of expected materials. Uniform scaling of the scattering density of all fixed surface voxels can occur. For example, only uniform scaling of the scattering density of all fixed surface voxels may occur or at least some uniform scaling of the scattering density of all fixed surface voxels may occur.

In general, because of the uncertainty in both the incident flux and in the scattering density of the material, it may be difficult to set it to a fixed value. In an instance, a scale factor is applied instead. If there are multiple materials in the surface, then a separate scale factor for each material may be needed.

A voxel is a small regular volume, often a rectangular prism. A voxel's geometry admits a tiling of the extended unit cell, that is, a finite set of these volumes which completely covers the extended unit cell with no overlap. In an instance, rendering systems can infer the position of a voxel based upon its position relative to other voxels (i.e., its position in the data structure that makes up a single volumetric image). Voxels can represent regularly sampled spaces that are non-homogeneously filled.

The voxels can take scattering values from a set of values associated with materials in the target, which may include the scattering or electron density of these materials. The scattering values can vary continuously in the metrological scheme described herein, which allows the shape within the target to be rendered down to the discretization level of a voxel. This rendering is similar to that of an x-ray image, wherein each picture element (pixel) has brightness proportional to the transmissivity of the target material to a cone of x-rays emitted from a point-like source.

Figure 6:
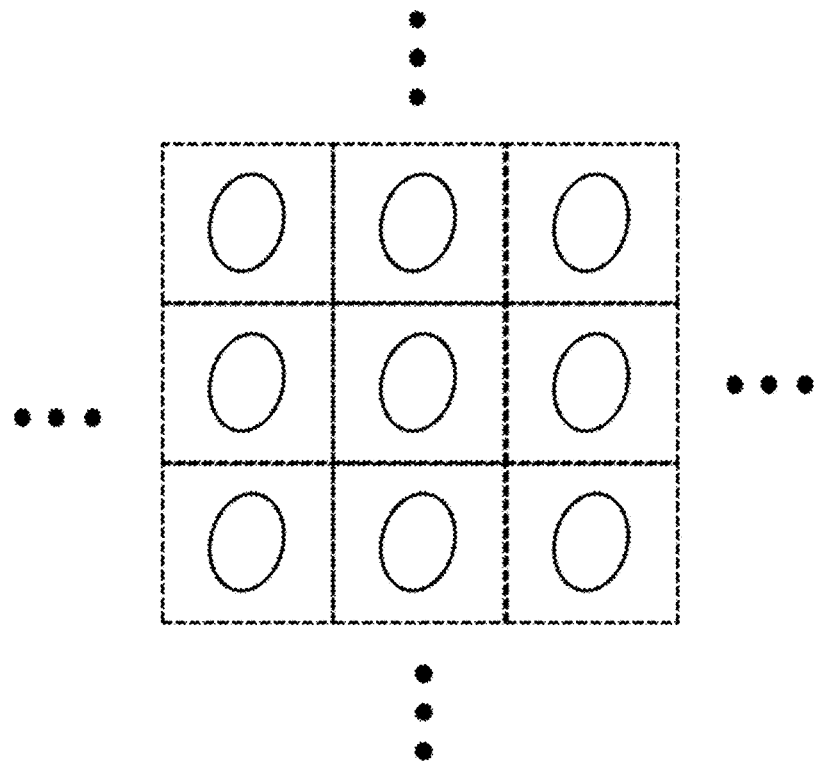
FIG. 6 is an exemplary 2D periodic array of holes in silicon.
Figure 7:
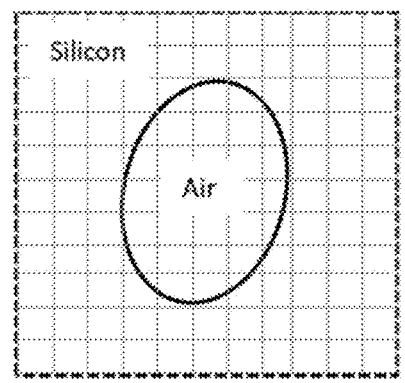
FIG. 7 is an exemplary surface as measured or imaged with grid lines for voxelization super-imposed.
Figure 8:
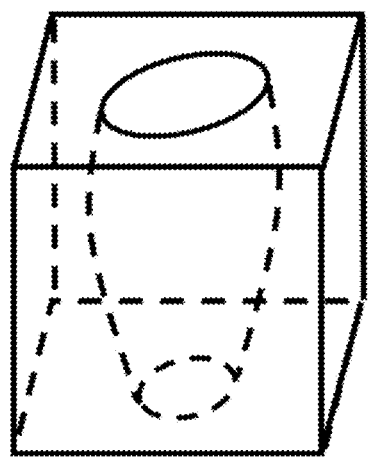
FIG. 8 is an exemplary 3D view of one unit cell within the 2D periodic array.
Figure 9:
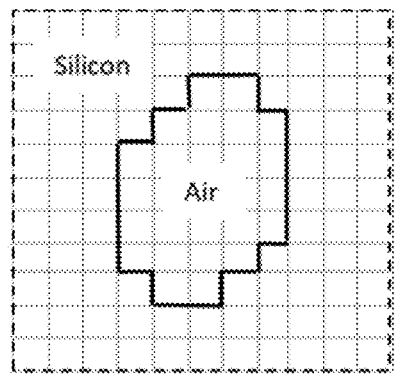
FIG. 9 is an exemplary surface as measured or imaged after voxelization with voxelized edges aligning with grid lines.
Figure 10:
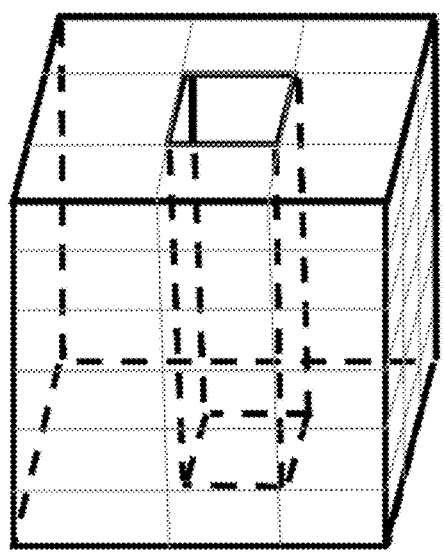
FIG. 10 is an exemplary 3D view of one unit cell within the 2D periodic array after a coarse voxelization.

FIGS. 6-10 are an example of the method 100. FIG. 6 is an exemplary 2D periodic array of holes in silicon. FIG. 7 is an exemplary surface as measured or imaged with grid lines for voxelization super-imposed. FIG. 7 may correspond to FIG. 6. FIG. 8 is an exemplary 3D view of one unit cell within the 2D periodic array. FIG. 9 is an exemplary surface as measured or imaged after voxelization with voxelized edges aligning with grid lines. FIG. 9 may correspond to FIG. 8. FIG. 10 is an exemplary 3D view of one unit cell within the 2D periodic array after a coarse voxelization. FIG. 10 shows a 3×3×6 array of voxels. A top layer of nine voxels is determined by an auxiliary measurement, and the remainder can be uniquely determined by x-ray scattering tomographic methods.

In an embodiment, the surface of the target can be measured with a measurement tool configured to use a reflection technique, particularly those systems that have a relatively small penetration depth of the target. The measurement tool also may be another wafer metrology tool or some other measurement system. In an example, the wafer metrology tool can be a reflection x-ray scatterometer and the measurement tool can be a transmission small angle x-ray scatterometer. In another example, the wafer metrology tool is an optical scatterometer and the measurement tool can be a transmission small angle x-ray scatterometer. Using these tools, singularly or in tandem, the surface of the target can be fixed to the geometry indicated by these metrology tools, modulo a uniform scaling of the scattering density of all the fixed surface voxels.

In a hybrid imaging embodiment, an imaging method such as CD-SEM imaging or coherent diffraction imaging can provide a measurement of the surface of the target. Using that image, a voxel map of the surface can be fixed to geometry of the imaging using the scattering density of the expected materials, modulo a uniform scaling of the scattering density of all the fixed surface voxels.

In a hybrid scatterometry embodiment, a method such as reflection-small angle x-ray scattering (R-SAXS) or optical scatterometry can provide a measurement of the geometry of the target when used in conjunction with a transmission technique (e.g., T-SAXS). Typically, such measurements would be relied upon to give accurate results to a given depth of the target. This is especially useful in VNAND channel hole measurements because the geometry of the channel holes is relatively simple at the top of the device, but has a more complicated geometry at the bottom of the device. Other examples devices/structures that could benefit from this approach are DRAM devices, W-recess structures, CMOS-Under-Array, and, in general, any relatively tall semiconductor devices. Scatterometry results that can only probe the top of a device have the potential to produce a more accurate measure of the upper geometry than T-SAXS alone.

Additionally, if a target is built up over multiple processing steps, a measurement at a prior processing step can be used to fix the geometry of a lower part of the target.

Using the reflection scatterometry results near the top surface, a voxel map of the of the upper portion of the voxel map can be fixed to the separately measured top geometry using the scattering density of the expected materials, allowing only uniform scaling of the scattering density of all the fixed surface voxels.

In an embodiment of computing a tomographic image of the target using T-SAXS, an optimization technique can be used whereby the values of the scattering densities associated with the voxels that are not fixed are varied in such a way that the simulated T-SAXS signal associated with the distribution of scattering densities matches the measured T-SAXS signal. Thus, the optimization minimizes the fit measure. If the T-SAXS signal has fewer degrees of freedom than SDM, or if the SDM to spectral map is rank deficient (a property the technique herein attempts to eliminate or reduce), an additional regularization term may be added to the optimization that reduces an entropic measure of the SDM. One such entropic measure is the L1 norm of the finite difference material gradient, i.e., the total variation.

A mixed integer approach may permit the voxels to take scattering values from a set of values associated with the materials known to be in the target. The mixed integer approach may use a material map. Numbers from a finite, countable set can be assigned to each region of the map based on materials. The scattering values of the materials can be permitted to continuously float to minimize the same or similar norm. The algorithm can be parallelizable because several separate processors can work on a unique integer material map and the standard optimization may be over a relatively small number of scattering density values. Thus, the processing time may be minimized compared to other techniques.

Heuristics can be employed to reduce the combinatoric complexity of the problem by, for example, applying a discrete measure of disparity between the initial integer voxel map and a proposed integer map and optimizing close by combinations first.

A mixed integer approach may work effectively with imaging methods or other methods that provide additional information about the target.

Figure 2:
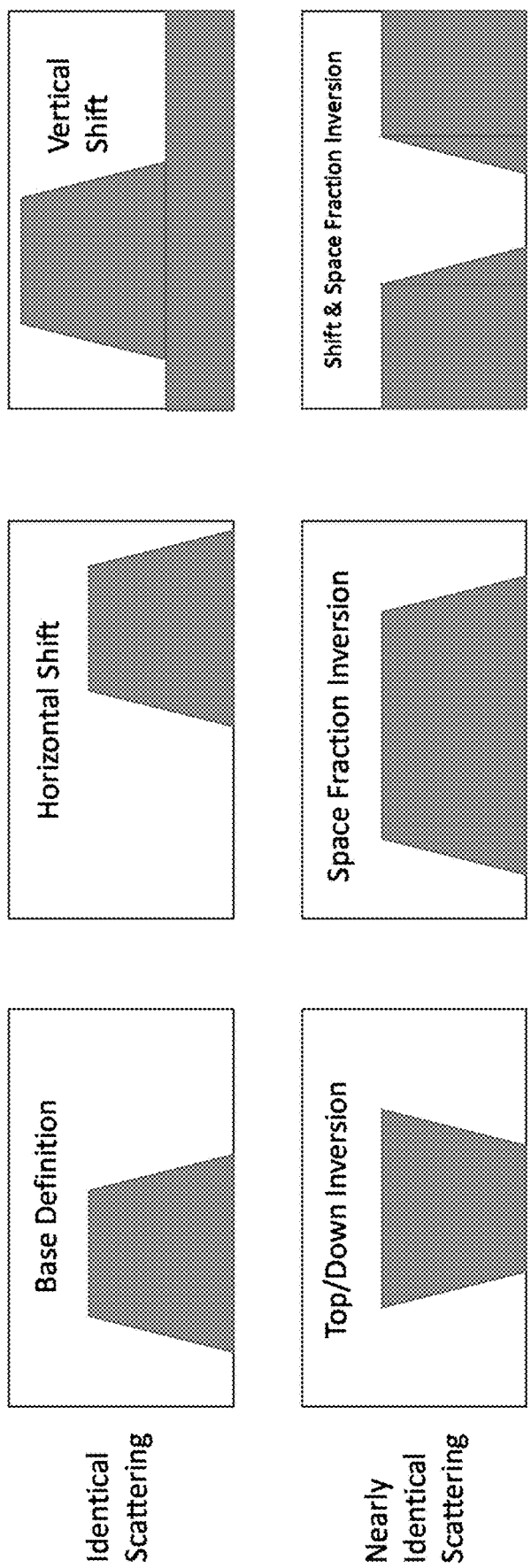
FIG. 2 illustrates exemplary 2D structures with similar scattering but with different definitions within a periodic unit cell.

SAXS measurements may include ambiguities inherent in measuring only far-field intensities. Complete spatial information is carried in the complex valued field amplitude, not in the real valued intensity, which is defined as the absolute value of the square of the field amplitude. In addition, vertical ambiguity may occur as a consequence of weak x-ray scattering. In T-SAXS tomography, the object can be flipped vertically and with roughly the same spectral match due to the weak scattering characteristics of hard x-rays. Space fraction ambiguity may occur as a consequence of the practical inability to measure the zeroth diffraction order, which can disambiguate the spectra in the case of simple rectangular grating. In T-SAXS tomography, a 2D grating with a line/space fraction of 40% can be represented by another grating with a line/space fraction of 60% and matched to the same measured signals. Translational ambiguity is a direct consequence of measuring intensity instead of amplitude. FIG. 2 illustrates exemplary 2D structures with similar scattering but with different definitions within a periodic unit cell.

Figure 3:
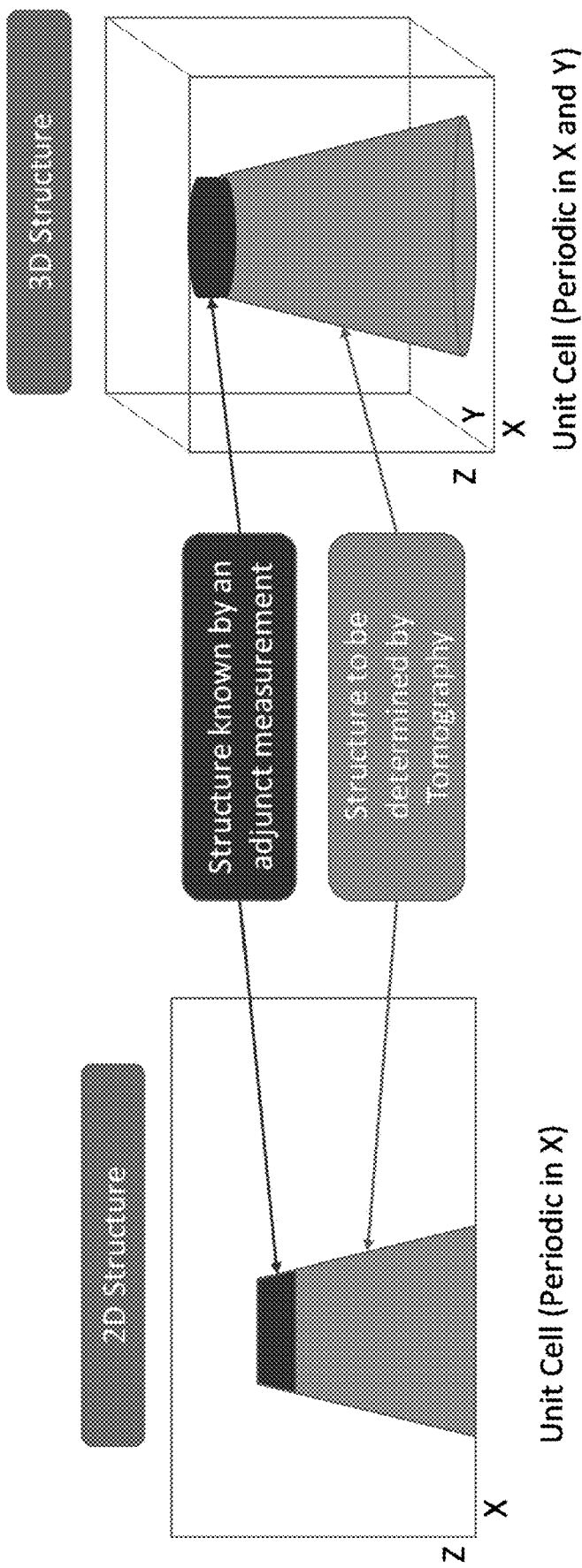
FIG. 3 illustrates phase revelation by adjunct measurement.

FIG. 3 illustrates phase revelation by adjunct measurement. An unknown phase in the model can be determined by knowing one part of the structure via an adjunct measurement, fixing it within the periodic unit cell, and taking a sufficient number of measurements at various illumination angles to determine the remainder of the structure.

Figure 4:
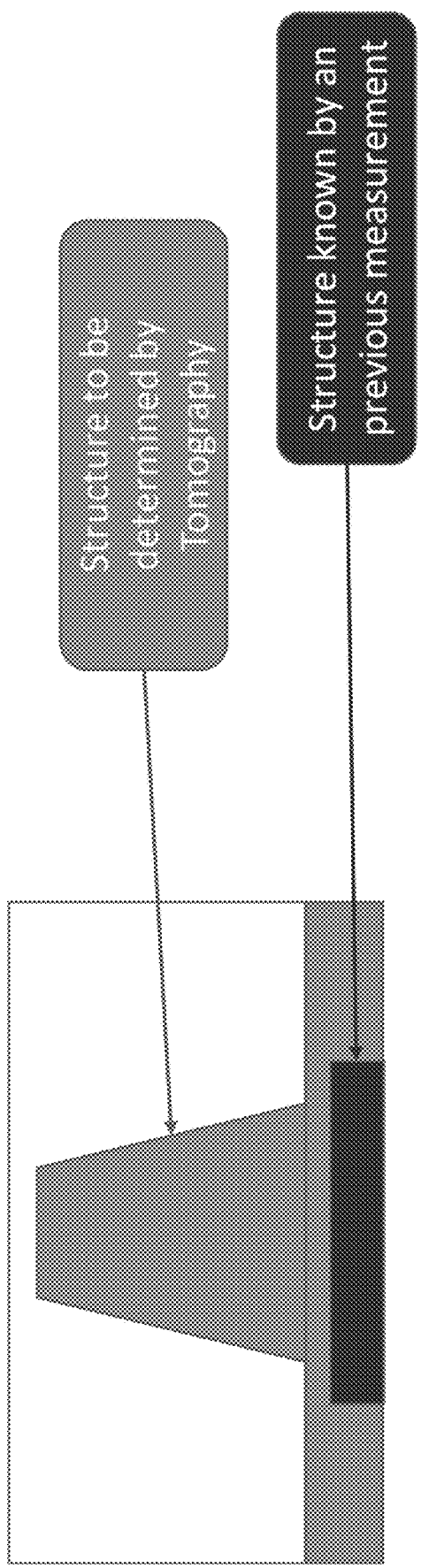
FIG. 4 illustrates phase revelation by previous measurement.

FIG. 4 illustrates phase revelation by previous measurement. The phase can be determined by independently manufacturing or placing an additional known structure below or above the target structure. The phase also can be determined by measuring part of it at a different step in the target fabrication process.

Phase revealing, like that in FIG. 4, can run from a bottom of a structure to a top of a structure.

Figure 5:
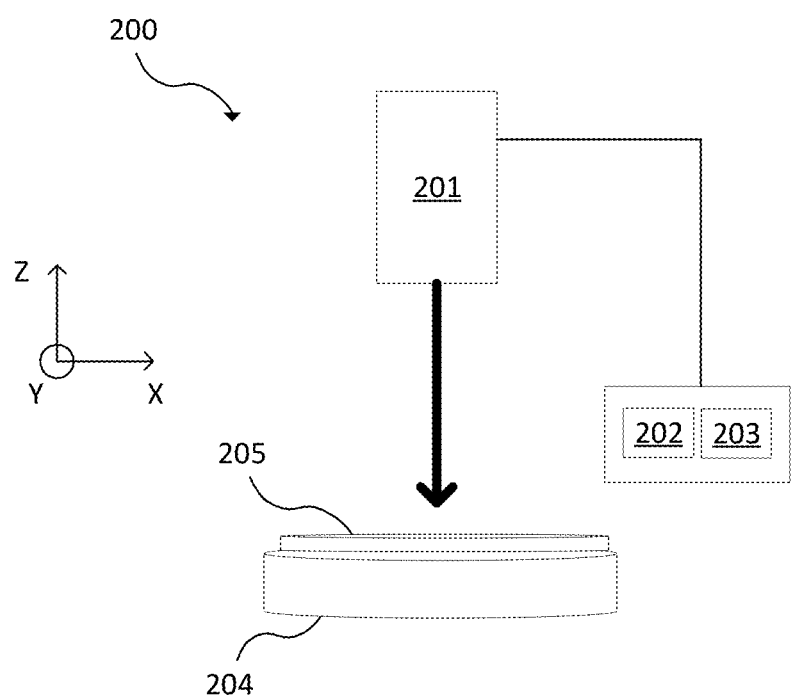
FIG. 5 is a block diagram of a system in accordance with the present disclosure.

FIG. 5 is a block diagram of an embodiment of a wafer metrology tool 200. The wafer metrology tool 200 includes a chuck 204 configured to hold a wafer 205 or other workpiece. The chuck 204 may be configured to move or rotate in one, two, or three axes. The chuck 204 also may be configured to spin, such as around the Z-axis.

The wafer metrology tool 200 also includes a measurement system 201 configured to measure part of a surface, a device, a feature, or a layer on the wafer 205. For example, the wafer metrology tool 200 can be configured to measure a surface of a target on a semiconductor wafer.

The wafer metrology tool 200 may be a CD-SEM, a reflection small angle x-ray scatterometer, or an optical scatterometer. For example, the wafer metrology tool 500 may have a hardware configuration like that shown in U.S. Pat. No. 7,933,026, which is incorporated herein by reference in its entirety.

If the wafer metrology tool 200 is a reflection small angle x-ray scatterometer or an optical scatterometer, a measurement tool (not illustrated in FIG. 5) configured use a transmission technique may be in electronic communication with the processor 202. The measurement tool may be a transmission small angle x-ray scatterometer. The wafer metrology tool 200 can be further configured to measure a geometry of the target.

Figure 11:
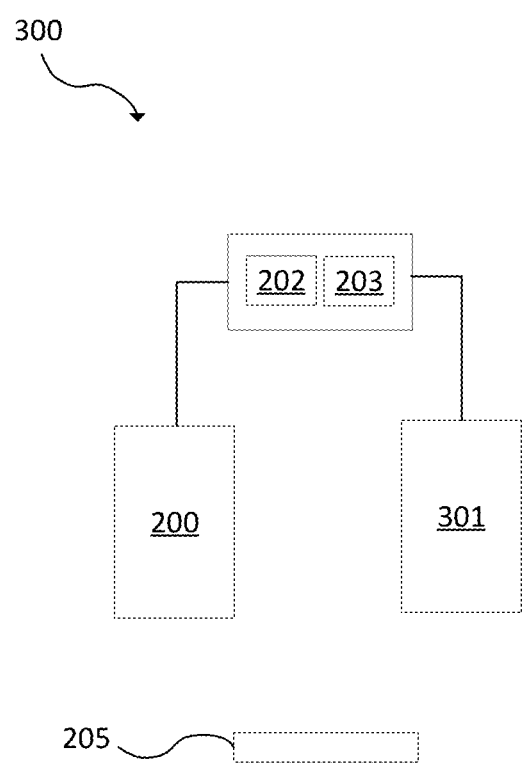
FIG. 11 is a block diagram of another system in accordance with the present disclosure.

FIG. 11 is a block diagram of a system 300. The wafer metrology tool 200 and the measurement tool 301 can both image or be used to measure aspects of the wafer 205. Both the wafer metrology tool 200 and the measurement tool 301 are in electronic communication with the processor 202 and the electronic data storage unit 203. The wafer metrology tool 200 and the measurement tool 301 may be part of the same system or the wafer 205 can be transferred between the wafer metrology tool 200 and the measurement tool 301.

Turning back to FIG. 5, the measurement system 201 may produce a beam of light, a beam of electrons, broad band plasma, or may use other techniques to measure a surface of the wafer 205. In one example, the measurement system 201 includes a laser. In another example, the wafer metrology tool 200 is a broad-band plasma inspection tool. The measurement system 201 can provide images of a target on the wafer 205 or can provide information used to form images of dies on the wafer 205.

In particular, the wafer metrology tool 200 or measurement system 201 can be configured to provide one or more of rotating polarizer rotating compensator spectroscopic ellipsometry data, full Mueller matrix components data, rotating polarizer spectroscopic ellipsometry data, reflectometry data, laser driven spectroscopic reflectometry data, or X-ray data.

In an instance, the wafer metrology tool 200 provides spectroscopic ellipsometry using a broadband light source, a measurement system 201 that measures how the light source interacts with the target, and processing algorithms that extract the relevant parameters of the target. The source might be a laser driven light source, which can provide high intensities and increase the signal-to-noise ratio at the detector, as opposed to a Xe lamp. In an example, the collection system includes a series of polarizers (rotating or fixed), compensators (rotating or fixed), detectors, spectrometers, cameras, lenses, mirrors, and/or collimators. To enhance target signatures, the system may use $N_2$ or Ar gas purge to extend the wavelength range to 170 nm or below.

The wafer metrology tool 200 communicates with a processor 202 and an electronic data storage unit 203 in electronic communication with the processor 202. For example, the processor 202 can communicate with the measurement system 201 or other components of the wafer metrology tool 200. The processor 202 may be implemented in practice by any combination of hardware, software, and firmware. Also, its functions as described herein may be performed by one unit, or divided up among different components, each of which may be implemented in turn by any combination of hardware, software, and firmware. Program code or instructions for the processor 202 to implement various methods and functions may be stored in controller readable storage media, such as a memory in the electronic data storage unit 203, within the processor 202, external to the processor 202, or combinations thereof.

While only one processor 202 and electronic data storage unit 203 are illustrated, more than one processor 202 and/or more than one electronic data storage unit 203 can be included. Each processor 202 may be in electronic communication with one or more of the electronic data storage units 203. In an embodiment, the one or more processors 202 are communicatively coupled. In this regard, the one or more processors 202 may receive readings received at the measurement system 201 and store the reading in the electronic data storage unit 203 of the processor 202. The processor 202 and/or electronic data storage unit 203 may be part of the wafer metrology tool 200 itself or may be separate from the wafer metrology tool 200 (e.g., a standalone control unit or in a centralized quality control unit).

The processor 202 may be coupled to the components of the wafer metrology tool 200 in any suitable manner (e.g., via one or more transmission media, which may include wired and/or wireless transmission media) such that the processor 202 can receive the output generated by the wafer metrology tool 200, such as output from the measurement system 201. The processor 202 may be configured to perform a number of functions using the output. For instance, the processor 202 may be configured to measure layers on the wafer 205. In another example, the processor 202 may be configured to send the output to an electronic data storage unit 203 or another storage medium without reviewing the output. The processor 202 may be further configured as described herein.

The processor 202, other system(s), or other subsystem(s) described herein may take various forms, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high speed processing and software, either as a standalone or a networked tool.

For example, the processor 202 may include a microprocessor, a microcontroller, or other devices.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The processor 202 also may be part of a defect review system, an inspection system, a metrology system, or some other type of system. Thus, the embodiments disclosed herein describe some configurations that can be tailored in a number of manners for systems having different capabilities that are more or less suitable for different applications.

The processor 202 may be in electronic communication with the measurement system 201 or other components of the wafer metrology tool 200. The processor 202 may be configured according to any of the embodiments described herein. The processor 202 also may be configured to perform other functions or additional steps using the output of the measurement system 201 or using images, measurements, or data from other sources.

An additional embodiment relates to a non-transitory computer-readable medium storing program instructions executable on a controller for performing a computer-implemented method, as disclosed herein. In particular, as shown in FIG. 5, the processor 202 can include a memory in the electronic data storage unit 203 or other electronic data storage medium with non-transitory computer-readable medium that includes program instructions executable on the processor 202. The computer-implemented method may include any step(s) of any method(s) described herein. For example, the processor 202 may be programmed to perform some or all of the steps of method 100. The memory in the electronic data storage unit 203 or other electronic data storage medium may be a storage medium such as a magnetic or optical disk, a magnetic tape, or any other suitable non-transitory computer-readable medium known in the art.

In an instance, the processor 202 can be configured to execute one or more software modules. For example, the processor 202 can be configured to fix a voxel map of the surface to geometry of measurements from the wafer metrology tool 200 using scattering density of expected materials. Only uniform scaling of the scattering density of all fixed surface voxels may occur. The electronic data storage unit 203 can be configured to store a plurality of scattering values associated with materials in the target. The processor 202 can be configured to take scattering values from the set of values for the voxels. The scattering values can float continuously.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

In another embodiment, the processor 202 may be communicatively coupled to any of the various components or sub-systems of wafer metrology tool 200 in any manner known in the art. Moreover, the processor 202 may be configured to receive and/or acquire data or information from other systems (e.g., inspection results from an inspection system such as a review tool, another measurement tool, a remote database including design data and the like) by a transmission medium that may include wired and/or wireless portions. In this manner, the transmission medium may serve as a data link between the processor 202 and other subsystems of the wafer metrology tool 200 or systems external to wafer metrology tool 200.

In some embodiments, various steps, functions, and/or operations of wafer metrology tool 200 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape and the like. A carrier medium may include a transmission medium such as a wire, cable, or wireless transmission link. For instance, the various steps described throughout the present disclosure may be carried out by a single processor 202 (or computer system) or, alternatively, multiple processors 202 (or multiple computer systems). Moreover, different sub-systems of the wafer metrology tool 200 may include one or more computing or logic systems. Therefore, the above description should not be interpreted as a limitation on the present disclosure, but merely an illustration.

In an instance, the wafer metrology tool 200 in FIG. 5 may include an illumination system which illuminates a target; a measurement system 201 which captures relevant information provided by the illumination system's interaction (or lack thereof) with a target, device, or feature on the wafer 205; and a processor 202 which analyzes the information collected using one or more algorithms.

The wafer metrology tool 200 can include one or more hardware configurations which may be used to measure the various semiconductor structural and material characteristics. Examples of such hardware configurations include, but are not limited to, a spectroscopic ellipsometer (SE); an SE with multiple angles of illumination; an SE measuring Mueller matrix elements (e.g., using rotating compensator(s)); a single-wavelength ellipsometers; a beam profile ellipsometer (angle-resolved ellipsometer); a beam profile reflectometer (angle-resolved reflectometer); a broadband reflective spectrometer (spectroscopic reflectometer); a single-wavelength reflectometer; an angle-resolved reflectometer; an imaging system; or a scatterometer (e.g., speckle analyzer). The hardware configurations can be separated into discrete operational systems or can be combined into a single tool.

The illumination system of certain hardware configurations can include one or more light sources. The light source may generate light having only one wavelength (i.e., monochromatic light), light having a number of discrete wavelengths (i.e., polychromatic light), light having multiple wavelengths (i.e., broadband light), and/or light the sweeps through wavelengths, either continuously or hopping between wavelengths (i.e., tunable sources or swept source). Examples of suitable light sources are: a white light source, an ultraviolet (UV) laser, an arc lamp or an electrode-less lamp, a laser sustained plasma (LSP) source, a supercontinuum source such as a broadband laser source, shorter-wavelength sources such as X-ray sources, extreme UV sources, or some combination thereof. The light source may also be configured to provide light having sufficient brightness, which in some cases may be a brightness greater than about 1 W/(nm cm² Sr). The wafer metrology tool 200 may also include a fast feedback to the light source for stabilizing its power and wavelength. Output of the light source can be delivered via free-space propagation, or in some cases delivered via optical fiber or light guide of any type.

The wafer metrology tool 200 may be designed to make many different types of measurements related to semiconductor manufacturing. For example, in certain embodiments the wafer metrology tool 200 may measure characteristics of one or more targets, such as critical dimensions, overlay, sidewall angles, film thicknesses, or process-related parameters (e.g., focus and/or dose). The targets can include certain regions of interest that are periodic in nature, such as gratings in a memory die. Targets can include multiple layers (or films) whose thicknesses can be measured by the wafer metrology tool 200. Targets can include target designs placed (or already existing) on the semiconductor wafer for use, such as with alignment and/or overlay registration operations. Certain targets can be located at various places on the semiconductor wafer. For example, targets can be located within the scribe lines (e.g., between dies) and/or located in the die itself. In certain embodiments, multiple targets are measured (at the same time or at differing times) by the same or multiple metrology tools. The data from such measurements may be combined. Data from the metrology tool can be used in the semiconductor manufacturing process, for example, to feed-forward, feed-backward, and/or feed-sideways corrections to the process (e.g., lithography, etch) and, therefore, can yield a complete process control solution.

To improve measurement accuracy and matching to actual device characteristics and to improve in-die or on-device measurements, various metrology implementations have been proposed. For example, focused beam ellipsometry based on primarily reflective optics can be used. Apodizers can be used to mitigate the effects of optical diffraction causing the spread of the illumination spot beyond the size defined by geometric optics. The use of high-numerical-aperture tools with simultaneous multiple angle-of-incidence illumination is another way to achieve small-target capability. Other measurement examples may include measuring the composition of one or more layers of the semiconductor stack, measuring certain defects on (or within) the wafer, and measuring the amount of photolithographic radiation exposed to the wafer. In some cases, a metrology tool and algorithm may be configured for measuring non-periodic targets.

Measurement of parameters of interest usually involves a number of algorithms. For example, optical interaction of the incident beam with the sample can be modeled using an electro-magnetic (EM) solver and can use algorithms such as rigorous coupled-wave analysis (RCWA), finite element method (FEM), method of moments, surface integral method, volume integral method, finite-difference time-domain (FDTD), and others. The target of interest is usually modeled (parametrized) using a geometric engine, or in some cases, process modeling engine or a combination of both. A geometric engine can be implemented, such as the AcuShape software product of KLA-Tencor.

Collected data can be analyzed by a number of data fitting and optimization techniques and technologies including: libraries; fast-reduced-order models; regression; machine-learning algorithms such as neural networks and support-vector machines (SVM); dimensionality-reduction algorithms such as principal component analysis (PCA), independent component analysis (ICA), and local-linear embedding (LLE); sparse representation such as Fourier or wavelet transform; Kalman filter; algorithms to promote matching from same or different tool types; and others. Collected data can also be analyzed by algorithms that do not include modeling, optimization and/or fitting.

Computational algorithms are usually optimized for metrology applications with one or more approaches being used such as design and implementation of computational hardware, parallelization, distribution of computation, load-balancing, multi-service support, or dynamic load optimization. Different implementations of algorithms can be done in firmware, software, field programmable gate array (FPGA), and programmable optics components, etc.

The data analysis and fitting steps usually pursue one or more goals. For example, the goal may be measurement of CD, sidewall angle (SWA), shape, stress, composition, films, bandgap, electrical properties, focus/dose, overlay, generating process parameters (e.g., resist state, partial pressure, temperature, and focusing model), and/or any combination thereof. The goal may be modeling and/or design of metrology systems. The goal also may be modeling, design, and/or optimization of metrology targets.

Embodiments of the present disclosure address the field of semiconductor metrology and are not limited to the hardware, algorithm/software implementations and architectures, and use cases summarized above.

Each of the steps of the method may be performed as described herein. The methods also may include any other step(s) that can be performed by the controller and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A method comprising:
   measuring a surface of a target on a semiconductor wafer using a wafer metrology tool; and
   using a processor, fixing a voxel map of the surface to match geometry measurements and using scattering density of expected materials, wherein uniform scaling of the scattering density of all fixed surface voxels occurs.

2. The method of claim 1, wherein the wafer metrology tool is a critical dimension scanning electron microscope.

3. The method of claim 1, wherein the wafer metrology tool is a reflection small angle x-ray scatterometer, and wherein the method further comprises measuring the surface of the target with a measurement tool configured in reflection mode.

4. The method of claim 3, wherein the measurement tool is a transmission small angle x-ray scatterometer.

5. The method of claim 1, wherein the wafer metrology tool is an optical scatterometer, and wherein the method further comprises measuring the surface of the target with a measurement tool configured use a transmission technique.

6. The method of claim 5, wherein the measurement tool is a transmission small angle x-ray scatterometer.

7. The method of claim 1, wherein measuring the surface of the target includes measuring a geometry of the target to provide the geometry measurements.

8. The method of claim 1, wherein voxels take scattering values from a set of values associated with materials in the target.

9. The method of claim 8, wherein the scattering values float continuously.

10. A system comprising:
a wafer metrology tool configured to measure a surface of a target on a semiconductor wafer; and
a processor in electronic communication with the wafer metrology tool, wherein the processor is configured to fix a voxel map of the surface to match geometry measurements and using scattering density of expected materials, wherein uniform scaling of the scattering density of all fixed surface voxels occurs.

11. The system of claim 10, wherein the wafer metrology tool is a critical dimension scanning electron microscope.

12. The system of claim 10, wherein the wafer metrology tool is a reflection small angle x-ray scatterometer, and wherein the system further comprises a measurement tool configured use a reflection mode in electronic communication with the processor.

13. The system of claim 12, wherein the measurement tool is a transmission small angle x-ray scatterometer.

14. The system of claim 10, wherein the wafer metrology tool is an optical scatterometer, and wherein the system further comprises a measurement tool configured use a transmission technique in electronic communication with the processor.

15. The system of claim 14, wherein the measurement tool is a transmission small angle x-ray scatterometer.

16. The system of claim 10, wherein the system further comprises a measurement tool configured use a transmission technique in electronic communication with the processor, and wherein the wafer metrology tool is further configured to measure a geometry of the target.

17. The system of claim 16, wherein the wafer metrology tool is a reflection small angle x-ray scatterometer or an optical scatterometer, and wherein the measurement tool is a transmission small angle x-ray scatterometer.

18. The system of claim 16, wherein the system further comprises an electronic data storage unit configured to store a plurality of scattering values associated with materials in the target, wherein the electronic data storage unit is in electronic communication with the processor.

19. The system of claim 18, wherein the processor is configured to take scattering values from the set of values for the voxels.

20. The system of claim 19, wherein the scattering values float continuously.

* * * * *